US008478970B2

(12) United States Patent
Kwon et al.

(10) Patent No.: US 8,478,970 B2
(45) Date of Patent: Jul. 2, 2013

(54) ACCESSING VALUE FOR LOCAL VARIABLE FROM FUNCTION CALL STACK UPON OFFSET MATCHING WITH INSTRUCTION EXTRACTED STACK POINTER OFFSET OR FROM CACHE

(75) Inventors: Young Su Kwon, Daejeon (KR); Nak Woong Eum, Daejeon (KR); Seong Mo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 424 days.

(21) Appl. No.: 12/832,313

(22) Filed: Jul. 8, 2010

(65) Prior Publication Data

US 2011/0055526 A1 Mar. 3, 2011

(30) Foreign Application Priority Data

Aug. 31, 2009 (KR) ........................ 10-2009-0081450

(51) Int. Cl.
*G06F 9/312* (2006.01)
*G06F 12/08* (2006.01)

(52) U.S. Cl.
USPC ........................................... 712/225; 711/118

(58) Field of Classification Search
None
See application file for complete search history.

(56) References Cited

U.S. PATENT DOCUMENTS 4,597,044 A * 6/1986 Circello ........................ 713/100
4,928,239 A * 5/1990 Baum et al. ................... 711/136
5,930,820 A * 7/1999 Lynch ........................... 711/132
6,289,418 B1 * 9/2001 Koppala ........................ 711/132
7,139,877 B2 * 11/2006 Hooker ......................... 711/132
7,174,469 B2 2/2007 Luick
7,260,106 B2 8/2007 Yavatkar et al.
7,318,164 B2 1/2008 Rawson, III
2004/0088686 A1 5/2004 Yamamoto et al.
2005/0091471 A1 4/2005 Conner et al.
2006/0195824 A1 8/2006 Iwamoto
2008/0209243 A1 8/2008 Ghiasi et al.

FOREIGN PATENT DOCUMENTS

JP 2002-157128 A 5/2002
JP 3785596 B2 6/2006
JP 2006-323824 A 11/2006
KR 2006-0120091 A 11/2006

* cited by examiner

*Primary Examiner* — Kenneth Kim
(74) *Attorney, Agent, or Firm* — Rabin & Berdo, P.C.

(57) ABSTRACT

There is provided a method and apparatus for accessing a memory according to a processor instruction. The apparatus includes: a stack offset extractor extracting an offset value from a stack pointer offset indicating a local variable in the processor instruction; a local stack storage including a plurality of items, each of which is formed of an activation bit indicating whether each item is activated, an offset storing an offset value of a stack pointer, and an element storing a local variable value of the stack pointer; an offset comparator comparing the extracted offset value with an offset value of each item and determining whether an item corresponding to the extracted offset value is present in the local stack storage; and a stack access controller controlling a processor to access the local stack storage or a cache memory according to a determining result of the offset comparator.

17 Claims, 4 Drawing Sheets

ACCESSING VALUE FOR LOCAL VARIABLE FROM FUNCTION CALL STACK UPON OFFSET MATCHING WITH INSTRUCTION EXTRACTED STACK POINTER OFFSET OR FROM CACHE

CROSS-REFERENCE TO RELATED APPLICATIONS

This application claims the priority of Korean Patent Application No. 10-2009-0081450 filed on Aug. 31, 2009, in the Korean Intellectual Property Office, the disclosure of which is incorporated herein by reference.

BACKGROUND OF THE INVENTION

1. Field of the Invention

The present invention relates to a processor structure, and more particularly, to a method and apparatus for accessing a memory according to a processor instruction in order to reduce memory access frequency when a processor accesses a stack memory in which a local variable is stored.

2. Description of the Related Art

A processor is hardware or an information provider (IP) executing algorithms for a specific application by reading an instruction stored in a storage medium such as a memory or a disk, performing a specific arithmetic or logic operation with respect to an operand according to operations encoded in that instruction, and storing the result thereof.

When the application algorithm is compiled by processor instructions, it is converted to a series of instructions. Here, global variables of the algorithm are stored in a main memory or a cache memory, while local variables of a function are stored in a stack.

A stack is a region of memory having a predetermined size and assigned to the main memory or the cache memory. Local variables of each function are only used in that function. When the function is completed, the local variables are no longer used. Accordingly, in order to store the local variables, the stack is employed. When the function is called, function depth is increased and the stack grows. When a function call is completed, the stack is also reduced proportionately to the number of local variables used in the function.

Meanwhile, as a result of analyzing an algorithm of a specific application which a processor is applied to, a considerable number of local variables in a function become accessed during the execution of the function. Also, the area where the local variables are actually stored is the stack in a memory area. While a function is called and completed, local variables of different functions are stored in the stack, thereby repeatedly performing memory access to the same stack.

Therefore, reviewing the distribution of energy consumption in the processor, a greater amount of energy is consumed in gaining access to the cache memory or the main memory than the energy consumed in the internal logic of the processor, thereby causing an increase in access frequency to the cache memory and the main memory.

SUMMARY OF THE INVENTION

An aspect of the present invention provides a method and apparatus for accessing a memory according to a processor instruction in order to allow for a reduction in stack memory access frequency for local variable access by configuring a local stack storage having a predetermined capacity in a processor.

According to an aspect of the present invention, there is provided an apparatus for accessing a memory according to a processor instruction, the apparatus including: a stack offset extractor extracting an offset value from a stack pointer offset indicating a local variable in the processor instruction; a local stack storage including a plurality of items, each of which is formed of an activation bit indicating whether each item is activated, an offset storing an offset value of a stack pointer, and an element storing a local variable value of the stack pointer; an offset comparator comparing the extracted offset value with an offset value of each item and determining whether an item corresponding to the extracted offset value is present in the local stack storage; and a stack access controller controlling a processor to access the local stack storage or a cache memory according to a determining result of the offset comparator.

According to another aspect of the present invention, there is provided a method of accessing a memory according to a processor instruction, the method including: an offset extracting operation in which an offset value is extracted from a stack pointer offset indicating a local variable in the processor instruction; and a local variable loading operation in which a local variable value is loaded by comparing the extracted offset value with an offset value of each item of a local stack storage, determining whether an item corresponding to the extracted offset value is present in the local stack storage, and allowing a processor to access the local stack storage or a cache memory according to a determining result.

According to another aspect of the present invention, there is provided a method of accessing a memory according to a processor instruction, the method including: an offset extracting operation in which an offset value is extracted from a stack pointer offset indicating a local variable in the processor instruction; and a local variable storing operation in which a local variable value is stored by comparing the extracted offset value with an offset value of each item of a local stack storage, determining whether an item corresponding to the extracted offset value is present in the local stack storage, and allowing a processor to access the local stack storage or a cache memory according to a determining result.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Also, detailed descriptions related to well-known functions or configurations will be ruled out in order not to unnecessarily obscure subject matters of the present invention.

Figure 1:
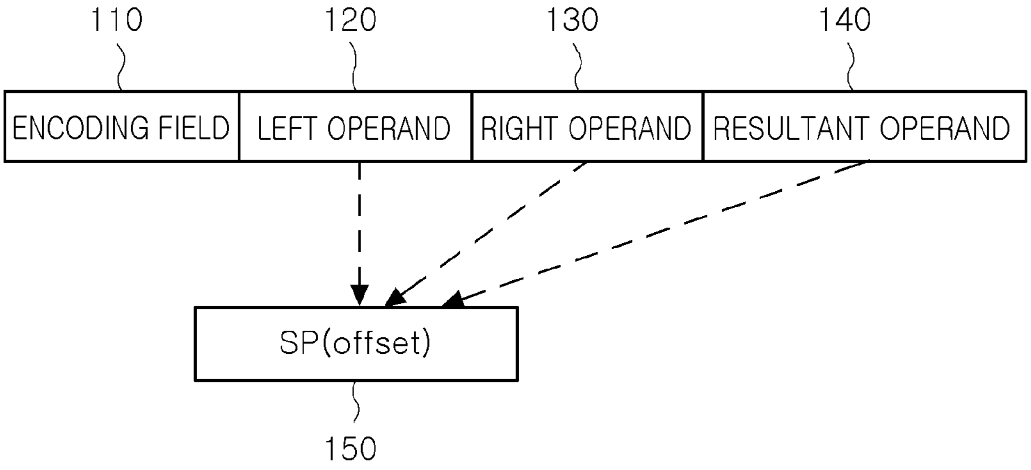
FIG. 1 illustrates a field structure of a general processor instruction.

FIG. 1 illustrates a field structure of a general processor instruction.

In general, there exist a variety of operands according to types of processor instruction. A representative instruction field is depicted in FIG. 1.

Referring to FIG. 1, a processor instruction includes an encoding field 110, a left operand 120, a right operand 130, and a resultant operand 140. Here, the encoding field 110 represents an operator.

Any one of the left operand 120, the right operand 130, and the resultant operand 140 may be a local variable.

An operand, representing a local variable, may be indicated as a stack pointer offset 150 (hereinafter, referred to as "SP (offset)"; here, "SP" means a stack pointer and "offset" means an offset value from the SP with respect to a local memory address where a local variable is located).

Figure 2:
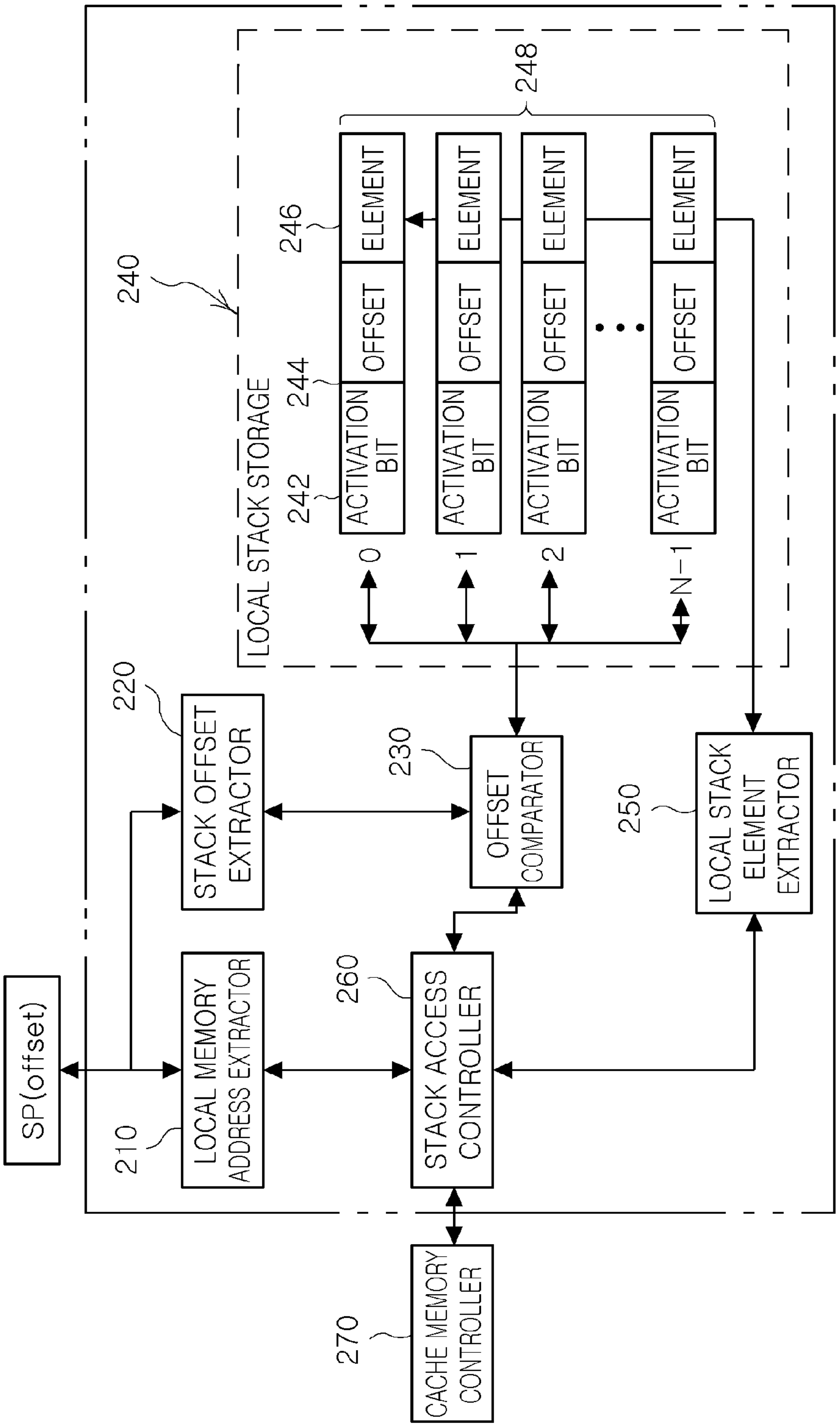
FIG. 2 illustrates a configuration of an apparatus for accessing a memory according to a processor instruction according to an exemplary embodiment of the present invention.

FIG. 2 illustrates a configuration of an apparatus for accessing a memory according to a processor instruction according to an exemplary embodiment of the present invention.

Referring to FIG. 2, an apparatus for accessing a memory according to a processor instruction in an exemplary embodiment of the invention includes a local memory address extractor 210, a stack offset extractor 220, an offset comparator 230, a local stack storage 240, a local stack element extractor 250, and a stack access controller 260.

The local memory address extractor 210 calculates a logic memory address from the SP (offset). That is, the local memory address extractor 210 calculates a logic memory address by adding an offset value to a value of the stack pointer.

The stack offset extractor 220 extracts an offset value from the SP (offset). Here, the extracted offset value is input into the offset comparator 230.

The local stack storage 240 is a set of register files including a plurality of items 248, each of which is formed of an activation bit 242, an offset 244, and an element 246. Here, the activation bit 242 indicates whether each item is active; the offset 244 stores an offset value of the stack pointer; and the element 246 stores a local variable value of the stack pointer.

In the case that a processor instruction is a read instruction, the offset comparator 230 compares an offset value extracted by the stack offset extractor 220 with an offset value of the item having an activation bit of "1" and determines whether activated items corresponding to an offset value is extracted from the local stack storage 240.

When activated items corresponding to the extracted offset value are present in the local stack storage 240, the stack access controller 260 controls the local stack element extractor 250 to select one of the elements of the corresponding items and provides the selected element to a processor.

When no activated item corresponding to the extracted offset value is present in the local stack storage 240, the stack access controller 260 transmits the previously calculated logic memory address to a cache memory controller 270 and controls the processor to access a cache memory. Here, when a deactivated item is present in the local stack storage 240, the stack access controller 260 stores a local variable value read from the cache memory in the element 246 of the deactivated item, stores an offset value in the offset 244 thereof, and converts an activation bit from "0" to "1".

In the case that a processor instruction is a write instruction, the offset comparator 230 compares an offset value extracted by the stack offset extractor 220 with an offset value of the item having an activation bit of "1" and determines whether activated items corresponding to the extracted offset value are present in the local stack storage 240.

When activated items corresponding to the extracted offset value are present in the local stack storage 240, the stack access controller 260 stores a local variable value, calculated as a result of the operation of the processor instruction, in one of the elements of the corresponding items which is selected by the local stack element extractor 250.

When no activated item corresponding to the extracted offset value is present in the local stack storage 240, the offset comparator 230 determines whether a deactivated item is present in the local stack storage 240. When a deactivated item is present in the local stack storage 240, the stack access controller 260 stores a local variable value, calculated as a result of the operation of the processor instruction, in the element 246 of the deactivated item, stores an offset value in the offset 244 thereof, and converts an activation bit from "0" to "1".

When no deactivated item is present in the local stack storage 240, the stack access controller 260 transmits the previously calculated logic memory address to the cache memory controller 270, and stores a local variable value calculated as a result of the operation of the processor instruction in the cache memory.

Figure 3:
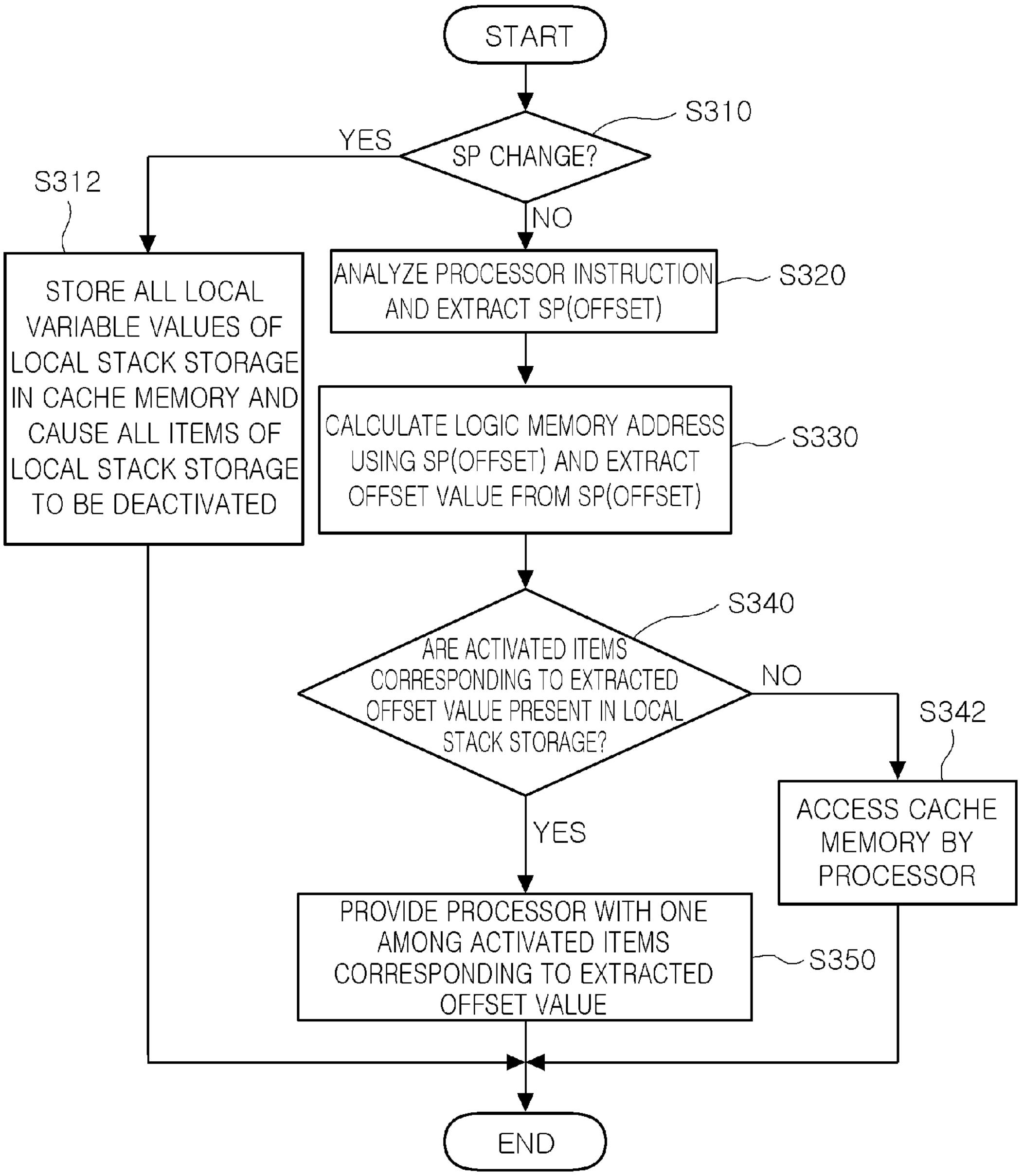
FIG. 3 is a flowchart illustrating a method for accessing a memory when a processor instruction is a read instruction according to an exemplary embodiment of the present invention.

FIG. 3 is a flowchart illustrating a method for accessing a memory when a processor instruction is a read instruction according to an exemplary embodiment of the present invention.

Referring to FIG. 3, the processor enters from an initial state to a normal state and determines whether there is a change of the stack pointer detected in the normal state in operation S310.

When there is a change in the stack pointer, all local variable values of the local stack storage 240 are stored in the cache memory and all items of the local stack storage 240 are deactivated in operation S312.

When there is no change in the stack pointer, an SP (offset) is extracted by analyzing a processor instruction in operation S320.

By the use of the SP (offset), a logic memory address is calculated and an offset value is extracted from the SP (offset) in operation S330. That is, the logic memory address is calculated by adding the offset value to a value of the stack pointer.

Then, it is determined whether activated items corresponding to the extracted offset value are present in the local stack storage 240 in operation S340. That is, by comparing the extracted offset value with an offset value of the item having an activation bit of "1", it is determined whether activated items corresponding to the extracted offset value are present.

When the activated items corresponding to the extracted offset value are present, one of the activated items corresponding to the extracted offset value is provided to the processor in operation S350. That is, one of the elements of the corresponding items is selected, and then the selected element is provided to the processor.

When no activated item corresponding to the extracted offset value is present, the processor is allowed to access the cache memory in operation S342. That is, the previously calculated logic memory address is transmitted to the cache memory controller 270, thereby allowing the processor to access the cache memory.

Figure 4:
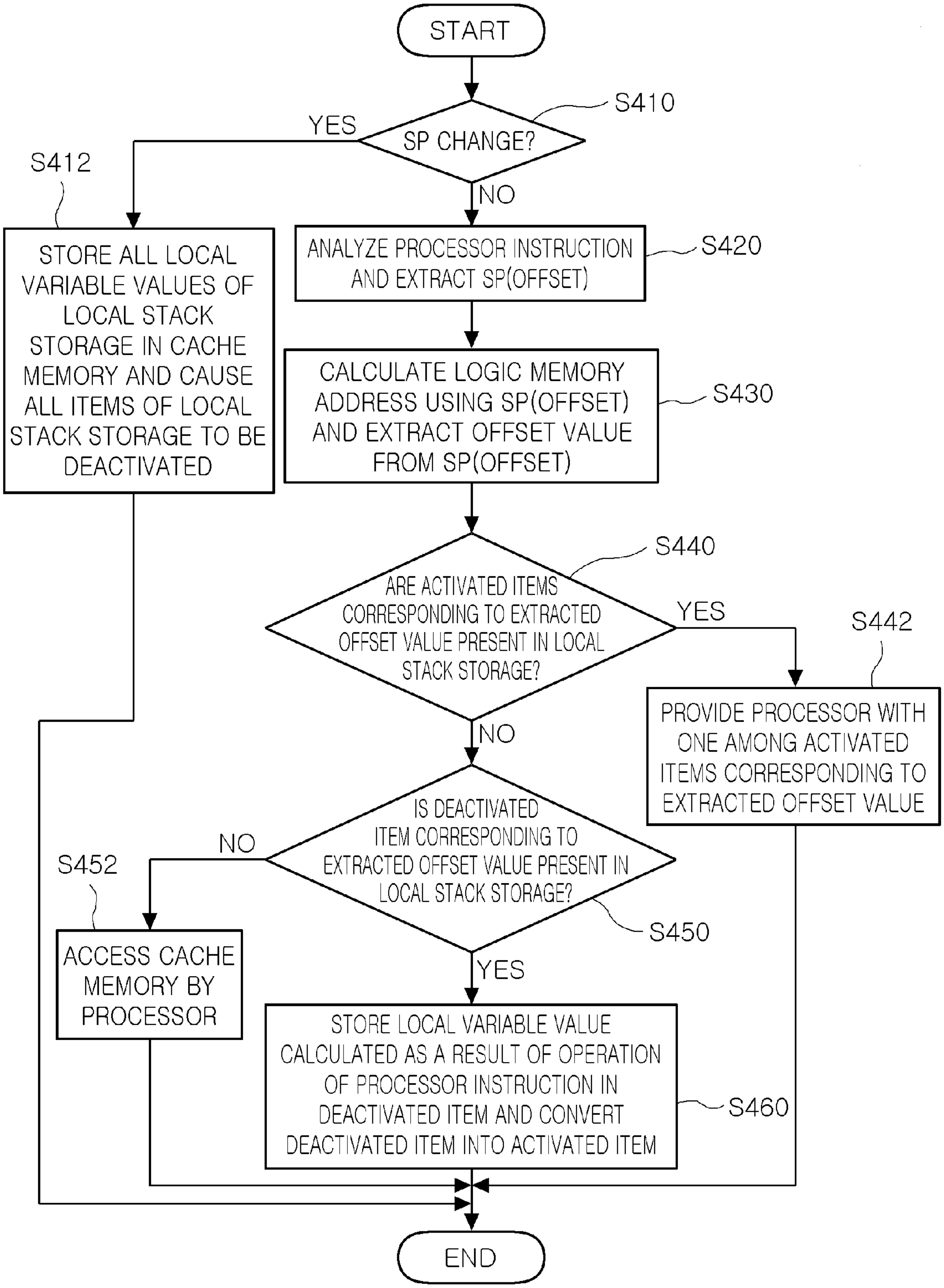
FIG. 4 is a flowchart illustrating a method for accessing a memory when a processor instruction is a write instruction according to an exemplary embodiment of the present invention.

FIG. 4 is a flowchart illustrating a method for accessing a memory when a processor instruction is a write instruction according to an exemplary embodiment of the present invention.

Referring to FIG. 4, the processor enters from an initial state to a normal state and determines whether there is a change of the stack pointer detected in the normal state in operation S410.

When there is a change in the stack pointer, all local variable values of the local stack storage 240 are stored in the cache memory and all items of the local stack storage 240 are deactivated in operation S412.

When there is no change in the stack pointer, an SP (offset) is extracted by analyzing a processor instruction in operation S420.

By the use of the SP (offset), a logic memory address is calculated and an offset value is extracted from the SP (offset) in operation S430. That is, the logic memory address is calculated by adding the offset value to a value of the stack pointer.

Then, it is determined whether activated items corresponding to the extracted offset value are present in the local stack storage 240 in operation S440. That is, by comparing the extracted offset value with an offset value of the item having an activation bit of "1", it is determined whether activated items corresponding to the extracted offset value are present.

When the activated items corresponding to the extracted offset value are present, one of the activated items corresponding to the extracted offset value is provided to the processor in operation S442. That is, one of the elements of the corresponding items is selected, and then the selected element is provided to the processor.

When no activated item corresponding to the extracted offset value is present, it is determined whether a deactivated item is present in the local stack storage 240 in operation S450. That is, it is determined whether an item having an activation bit of "0" is present in the local stack storage 240.

When a deactivated item is present in the local stack storage 240, a local variable value calculated as a result of the operation of the processor instruction and an offset value are respectively stored in the element 246 and the offset 244 of the deactivated item, and an activation bit is converted from "0" to "1" in operation S460.

When no deactivated item is present in the local stack storage 240, the processor is allowed to access the cache memory in operation S452. That is, the previously calculated logic memory address is transmitted to the cache memory controller 270, and accordingly the local variable value calculated as a result of the operation of the processor instruction is stored in the cache memory.

As set forth above, according to exemplary embodiments of the invention, there is provided a method and apparatus for accessing a memory according to a processor instruction in order to reduce stack memory access frequency for local variable access by configuring a local stack storage having a predetermined capacity in a processor, whereby processor's energy consumption is reduced and processor performance is enhanced.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for accessing a memory according to a processor instruction, the apparatus comprising:

a stack offset extractor extracting an offset value from a stack pointer offset indicating a local variable in the processor instruction;

a local stack storage including a plurality of items, each of which is formed of an activation bit indicating whether each item is activated, an offset storing an offset value of a stack pointer, and an element storing a local variable value of the stack pointer;

an offset comparator comparing the extracted offset value with an offset value of each item and determining whether an item corresponding to the extracted offset value is present in the local stack storage; and a stack access controller controlling a processor to access the local stack storage or a cache memory according to a determining result of the offset comparator.

2. The apparatus of claim 1, wherein the stack access controller controls a local stack element extractor to select one among elements of items and provides the selected element to the processor when the processor instruction is a read instruction and activated items corresponding to the extracted offset value are present in the local stack storage.

3. The apparatus of claim 2, wherein the stack access controller controls the processor to access the cache memory when no activated item corresponding to the extracted offset value is present in the local stack storage.

4. The apparatus of claim 3, wherein the stack access controller stores a local variable value read from the cache memory in an element of a deactivated item and converts the deactivated item into an activated item when the deactivated item is present in the local stack storage.

5. The apparatus of claim 1, wherein the stack access controller stores a local variable value, calculated as a result of an operation of the processor instruction, in one among elements of items which is selected by a local stack element extractor when the processor instruction is a write instruction and activated items corresponding to the extracted offset value are present in the local stack storage.

6. The apparatus of claim 5, wherein the stack access controller stores the local variable value calculated as the result of the operation of the processor instruction in an element of a deactivated item and converts the deactivated item into an activated item when the activated items corresponding to the extracted offset value are absent and the deactivated item is present in the local stack storage.

7. The apparatus of claim 5, wherein the stack access controller stores the local variable value calculated as the result of the operation of the processor instruction in the cache memory when no activated and deactivated item is present in the local stack storage.

8. A method of accessing a memory according to a processor instruction, the method comprising:

an offset extracting operation in which an offset value is extracted from a stack pointer offset indicating a local variable in the processor instruction; and a local variable loading operation in which a local variable value is loaded by comparing the extracted offset value with an offset value of each item of a local stack storage, determining whether an item corresponding to the extracted offset value is present in the local stack storage, and allowing a processor to access the local stack storage or a cache memory according to a determining result.

9. The method of claim 8, wherein the local variable loading operation comprises:

determining whether activated items corresponding to the extracted offset value are present; and providing one of the corresponding items to the processor when the activated items corresponding to the extracted offset value are present.

10. The method of claim 9, further comprising accessing, by the processor, the cache memory when no activated item corresponding to the extracted offset value is present.

11. The method of claim 10, wherein the accessing of the cache memory by the processor comprises storing a local variable value read from the cache memory in a deactivated item and converting the deactivated item into an activated item when the deactivated item is present.

12. The method of claim 8, further comprising:

determining whether there is a change in a stack pointer; and storing all local variable values of the local stack storage in the cache memory and causing all items of the local stack storage to be deactivated when there is a change in the stack pointer.

13. A method of accessing a memory according to a processor instruction, the method comprising:

an offset extracting operation in which an offset value is extracted from a stack pointer offset indicating a local variable in the processor instruction; and a local variable storing operation in which a local variable value is stored by comparing the extracted offset value with an offset value of each item of a local stack storage, determining whether an item corresponding to the extracted offset value is present in the local stack storage, and allowing a processor to access the local stack storage or a cache memory according to a determining result.

14. The method of claim 13, wherein the local variable storing operation comprises:

determining whether activated items corresponding to the extracted offset value are present; and storing the local variable value calculated as a result of an operation of the processor instruction in one of the corresponding items when the activated items corresponding to the extracted offset value are present.

15. The method of claim 14, further comprising:

determining whether a deactivated item is present when no activated item corresponding to the extracted offset value is present; and storing the local variable value calculated as the result of the operation of the processor instruction in the deactivated item and converting the deactivated item into an activated item when the deactivated item is present.

16. The method of claim 15, further comprising storing the local variable value calculated as the result of the operation of the processor instruction in the cache memory when no deactivated item is present.

17. The method of claim 13, further comprising:

determining whether there is a change in a stack pointer; and storing all local variable values of the local stack storage in the cache memory and causing all items of the local stack storage to be deactivated when there is a change in the stack pointer.

* * * * *